(No Model.) 2 Sheets—Sheet 1.

O. T. BLÁTHY.
ALTERNATING CURRENT MOTOR.

No. 482,974. Patented Sept. 20, 1892.

WITNESSES:
John Revell
George Baumann

INVENTOR
Otto Titus Bláthy
BY
Howson and Howson
his ATTORNEYS (No Model.) 2 Sheets—Sheet 2.

O. T. BLÁTHY.
ALTERNATING CURRENT MOTOR.

No. 482,974. Patented Sept. 20, 1892.

WITNESSES:
George Baumann
John Revell

INVENTOR
Otto Titus Bláthy
BY
Howson and Howson
his ATTORNEYS

UNITED STATES PATENT OFFICE.

OTTO TITUS BLÁTHY, OF BUDA-PESTH, AUSTRIA-HUNGARY.

ALTERNATING-CURRENT MOTOR.

SPECIFICATION forming part of Letters Patent No. 482,974, dated September 20, 1892.

Application filed December 7, 1891. Serial No. 414,220. (No model.)

*To all whom it may concern:*

Be it known that I, OTTO TITUS BLÁTHY, a subject of the King of Hungary, and a resident of Buda-Pesth, Austria-Hungary, have invented new and useful Improvements in Alternating-Current Motors, of which the following is a specification.

This invention consists of an alternating-current motor working on the Ferraris rotary-magnetic-field principle, but capable of being actuated by a simple alternating current. The motor has two systems of field-magnet coils requiring two alternating currents displaced in phase, respectively, to one another; and the salient feature of this invention is the manner in which the said displacement of phase is obtained.

Figure 1:
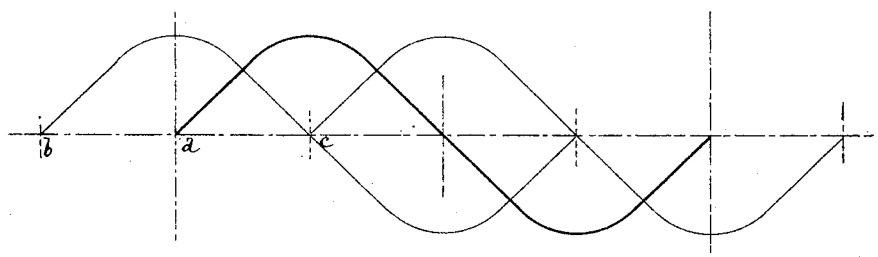
Figure 2:
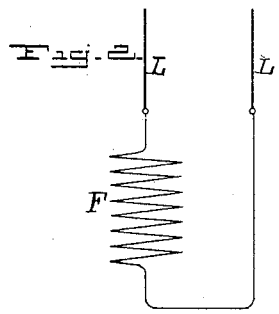
Figure 3:
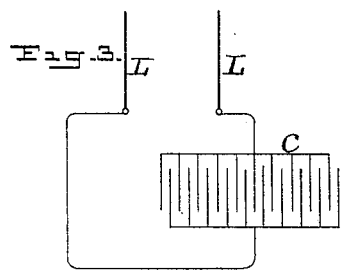
Figure 5:
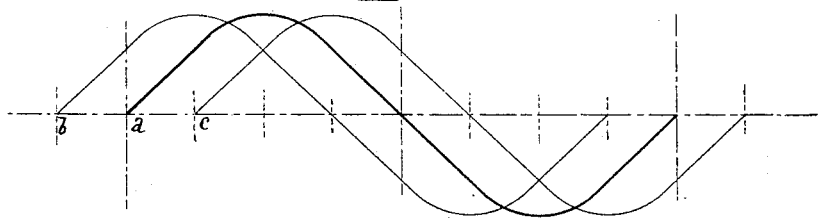
Figure 4:
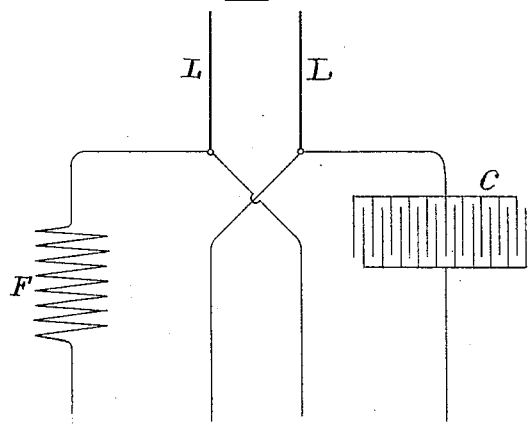
Figure 6:
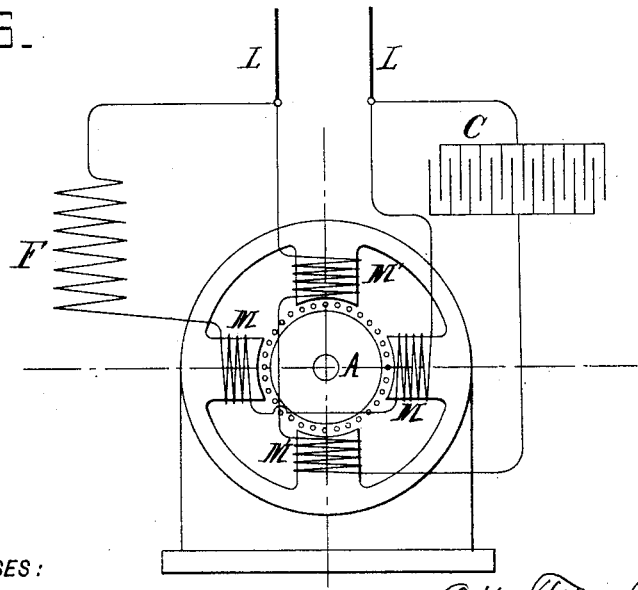

In the diagram Figure 1 the potential-difference curve of a simple alternating current is represented by $a$. If the current is passed through a coil F, Fig. 2, of high self-induction, then the curve of the current $b$ will be displaced nearly by a quarter of a period backward of the curve $a$. If, on the contrary, a condenser C, Fig. 3, of adequate capacity is introduced into the circuit, the current-curve $c$ will be displaced by nearly a quarter-period in advance of the curve $a$. If both devices are made use of, it is obvious that a simple alternating current can be split into two alternating currents displaced in phase by nearly half a period. It is not desirable for the purpose in view to have two currents with such difference in phase; but in using the two devices mentioned above, as indicated in Fig. 4, with suitable choice of the coefficient of the self-induction of the coil and of the capacity of the condenser and the resistances of the two circuits it is possible to obtain two currents $b$ and $c$, as indicated in the diagram Fig. 5, which have a difference in phase of a quarter-period only, and these are suitable for the production of a rotary magnetic field for motor work. In Fig. 6 such a polyphase-current motor is shown provided with two field-magnet circuits M M and M' M', which form two branches of the common supply-leads, in which two branches, however, the phase of the current is in one case shifted backward by the action of the interposed self-induction coil F, while in the other branch the shifting forward is effected by the condenser C, the action taking place as shown in the diagram Fig. 5, the result being a rotary magnetic field acting inductively and dynamically upon a suitable armature A, and thus actuating the motor.

Alternating-current motors have heretofore been made with two systems of field-magnets excited by the same current-generator, the current of one of these systems being influenced by a condenser. As the dimensions, both constructive and magnetic, of the two systems of field-magnets must be identical, the relation between the self-induction of the magnetic circuit, the potential in the circuit, and the magnetizing force (ampère-turns) is fixed. The relation between the active potential and the self-induction of one of the field-magnet systems is altered if a condenser is placed in series to it—that is, by this means the phase of this current can be accelerated. It is also difficult by placing only a condenser in one exciting-circuit of a machine to produce there such a change of phase that the desired difference of a quarter-wave shall exist between the two field-currents. If, however, there at the same time be employed in the other exciting-circuit a self-induction coil, the desired difference is easily obtained. To express it in other words, if a condenser of sufficient size and capacity is placed in one circuit or branch the self-induction of said circuit is eliminated or at least lessened by said condenser and the current in that circuit will be less retarded than if the condenser were not there, while, on the other hand, the self-induction coil in the other alternating-current circuit tends to retard the time of maximum electro-motive force.

By the simultaneous use of a condenser and a self-induction coil I obtain the advantage of having a much smaller condenser than if all the displacement of phase were to be effected by condensers, as the self-induction coil very much lightens the duty to be performed by the condenser. Another advantage is the simplicity of adjustment of the coil, the coefficient of self-induction of which can easily be varied in the manners known in the art, whereas the variation of the capacity of a condenser is not quite so easily and nicely effected.

Figure 7:
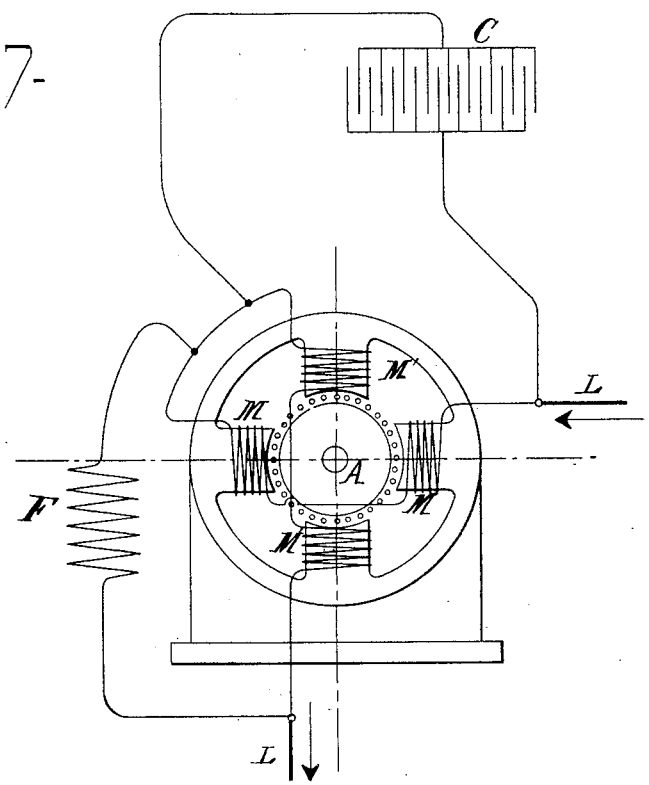

Another manner of carrying out my invention is shown in Fig. 7. Here the two groups of field-coils M M and M' M' are connected up in series with each other and with the supply-leads and one of the field-coils M M is shunted by a self-induction coil F, and thereby the phase of the current in M M displaced, while the second field-coil set M' M' is shunted by a condenser C C, the displacement of phase of the current in M' M' taking place in the inverse direction to that in M M, and thus the result attained is the same as shown in Fig. 5.

I claim as my invention—

1. A rotary-field alternating-current motor with two sets of field-magnet coils supplied from a source of simple alternating currents and self-induction coils and condensers connected up with the said field-magnet circuits, whereby the said currents are displaced in phase, as and for the purpose set forth.

2. A rotary-field alternating-current motor with two sets of field-magnet coils forming two branch circuits of the supply-leads, with a self-induction coil included in one of the said branch circuits and a condenser in the other branch circuit.

In testimony whereof I have signed my name to this specification in the presence of two subscribing witnesses.

OTTO TITUS BLÁTHY.

Witnesses:
  D. M. HOORZ,
  HANS KÜRSTEN.